United States Patent
Lee

(10) Patent No.: US 9,600,873 B2
(45) Date of Patent: Mar. 21, 2017

(54) DEPOSITION ACCURACY DETERMINATION APPARATUS AND DEPOSITION ACCURACY DETERMINATION METHOD USING THE SAME

(71) Applicant: Samsung Display Co., Ltd., Yongin (KR)

(72) Inventor: Jiwoo Lee, Yongin (KR)

(73) Assignee: Samsung Display Co., Ltd., Yongin (KR)

( * ) Notice: Subject to any disclaimer, the term of this patent is extended or adjusted under 35 U.S.C. 154(b) by 0 days.

(21) Appl. No.: 14/638,372

(22) Filed: Mar. 4, 2015

(65) Prior Publication Data

US 2016/0093041 A1   Mar. 31, 2016

(30) Foreign Application Priority Data

Sep. 26, 2014   (KR) .................. 10-2014-0129529

(51) Int. Cl.
| | | |
|---|---|---|
| *G06K 9/00* | (2006.01) | |
| *G06T 7/00* | (2017.01) | |
| *G06T 5/00* | (2006.01) | |

(52) U.S. Cl.
CPC ............ *G06T 7/0004* (2013.01); *G06T 5/002* (2013.01); *G06K 9/00* (2013.01); *G06T 2207/30121* (2013.01)

(58) Field of Classification Search
CPC ... H01L 51/0011; H01L 21/682; H01L 51/56; H01L 22/12; H01L 27/14667; H01L 21/67253; H01L 21/681; H01L 21/02104; H01L 51/5064; H01L 51/5262; H01L 2227/323; H01L 27/1222; H01L 27/1288; H01L 29/78696; H01L 2251/5369; H01L 27/3211; H01L 51/0003; H01L 51/0007; H01L 51/5016; H01L 51/5036; C23C 14/042; C23C 14/12; C23C 14/54; G01B 11/14; G01B 11/0641; G03F 1/84; G03F 7/70625; G03F 9/7003; G03F 9/7084; G03F 9/7092; G03F 7/706; G03F 9/00; G01N 21/956; G01N 21/95607; G01N 21/6452; G01N 33/521; G06T 7/004; G06T 2207/30148; G06T 7/0042; H04N 1/00795;

(Continued)

(56) References Cited

U.S. PATENT DOCUMENTS 6,096,496 A * 8/2000 Frankel ............... B01J 19/0046
365/129
6,287,595 B1 * 9/2001 Loewy ...................... A61J 3/00
424/451

(Continued)

FOREIGN PATENT DOCUMENTS

| KR | 10-2010-0099894 | 9/2010 |
|---|---|---|
| KR | 10-2012-0044247 | 5/2012 |

(Continued)

*Primary Examiner* — Vu Le
*Assistant Examiner* — Aklilu Woldemariam
(74) *Attorney, Agent, or Firm* — H.C. Park & Associates, PLC

(57) ABSTRACT

A deposition accuracy determination method, including: capturing an image of a thin film for inspection formed on a substrate by depositing a mask; and converting the image to a color profile to distinguish false measurement data.

7 Claims, 3 Drawing Sheets

(58) Field of Classification Search
CPC .. H04N 1/03; G06K 2209/19; G02B 21/0056; G02B 21/0068; G11B 7/12; G11B 11/007; G11B 7/00; G01M 11/0292; Y10T 29/49401; B41J 2/1404; B41J 2/1645; B65B 1/30; G11C 7/005; B82Y 20/00; B82Y 30/00
USPC ........ 382/152, 144, 141, 209; 356/124, 239; 365/129, 151
See application file for complete search history.

(56) References Cited

U.S. PATENT DOCUMENTS

| | | | |
|---|---|---|---|
| 6,693,713 B1 * | 2/2004 | Nakajima | G03F 9/70 356/400 |
| 7,443,493 B2 * | 10/2008 | Oishi | G01M 11/0292 356/124 |
| 7,522,762 B2 * | 4/2009 | Rea | G01M 11/00 382/141 |
| 8,224,590 B2 | 7/2012 | Cho et al. | |
| 8,860,017 B2 | 10/2014 | Jin et al. | |
| 2001/0028733 A1 * | 10/2001 | Sasaki | G01N 21/956 382/149 |
| 2002/0109824 A1 * | 8/2002 | Yamaguchi | G03B 27/42 355/53 |
| 2004/0017525 A1 * | 1/2004 | Takizawa | G02F 1/133555 349/106 |
| 2004/0179184 A1 * | 9/2004 | Levasier | G03F 9/7003 355/75 |
| 2004/0179190 A1 * | 9/2004 | Miyashita | G03F 7/706 356/124 |
| 2005/0016463 A1 * | 1/2005 | Hirano | C23C 14/048 118/726 |
| 2005/0129860 A1 * | 6/2005 | Echigo | B05D 1/60 427/385.5 |
| 2007/0036887 A1 * | 2/2007 | Haase | C23C 14/042 427/64 |
| 2010/0040283 A1 * | 2/2010 | Tsukioka | G06T 5/009 382/167 |
| 2010/0247743 A1 * | 9/2010 | Komori | B41J 2/04508 427/8 |
| 2011/0076599 A1 * | 3/2011 | Chung | C23C 14/042 430/5 |
| 2012/0103255 A1 | 5/2012 | Fukuda | |
| 2014/0284559 A1 * | 9/2014 | Kim | H01L 51/0011 257/40 |

FOREIGN PATENT DOCUMENTS

| | | |
|---|---|---|
| KR | 10-2013-0047601 | 5/2013 |
| KR | 10-2013-0125240 | 11/2013 |
| KR | 10-2014-0007988 | 1/2014 |

* cited by examiner

DEPOSITION ACCURACY DETERMINATION APPARATUS AND DEPOSITION ACCURACY DETERMINATION METHOD USING THE SAME

RELATED APPLICATION

This application claims priority from and the benefit of Korean Patent Application No. 10-2014-0129529, filed on Sep. 26, 2014, which is hereby incorporated by reference for all purposes as if fully set forth herein.

BACKGROUND

Field

Exemplary embodiments of the present invention relate to a deposition accuracy determination apparatus and a deposition accuracy determination method using the same, which determines the accuracy at which a thin film is formed via a mask deposition process.

Discussion of the Background

A deposition process in which vapor is generated from a deposition source and the vapor is deposited onto a surface of a substrate may be used during a thin-film manufacturing process for forming a thin film of an organic light-emitting display apparatus. More specifically, during the deposition process, a mask is disposed on the substrate, and the vapor generated from the deposition source passes through an opening of the mask, thereby forming the thin film having a desired pattern on the substrate.

The above information disclosed in this Background section is only for enhancement of understanding of the background of the present invention and therefore it may contain information that does not form any part of the prior art nor what the prior art may suggest to a person of ordinary skill in the art.

SUMMARY

Exemplary embodiments of the present invention provide a deposition accuracy determination apparatus and a deposition accuracy determination method using the same.

Additional aspects will be set forth in part in the description which follows and, in part, will be apparent from the description, or may be learned by practice of the present invention.

An exemplary embodiment of the present invention discloses a deposition accuracy determination apparatus, including: a camera that captures an image of a thin film for inspection formed on a substrate and a controller that converts the image to a color profile to distinguish false measurement data.

An exemplary embodiment of the present invention also discloses a deposition accuracy determination method, including: capturing an image of a thin film for inspection formed on a substrate by depositing a mask and converting the image to a color profile to distinguish false measurement data.

It is to be understood that both the foregoing general description and the following detailed description are exemplary and explanatory and are intended to provide further explanation of the present invention as claimed.

BRIEF DESCRIPTION OF THE DRAWINGS

The accompanying drawings, which are included to provide a further understanding of the inventive concept and are incorporated in and constitute a part of this specification, illustrate exemplary embodiments of the present invention, and together with the description serve to explain the principles of the inventive concept.

DETAILED DESCRIPTION OF THE ILLUSTRATED EMBODIMENTS

Figure 1:
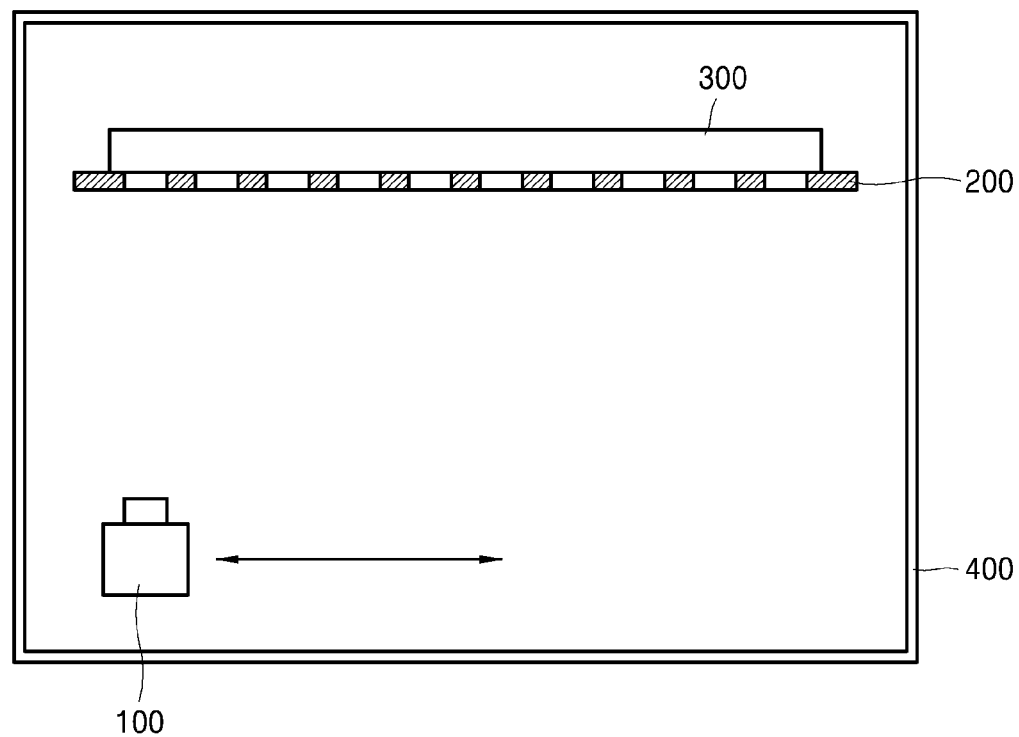
FIG. 1 is a schematic diagram of a general structure of a thin-film deposition apparatus.

Reference will now be made in detail to embodiments, examples of which are illustrated in the accompanying drawings. In this regard, the present embodiments may have different forms and should not be construed as being limited to the descriptions set forth herein. Accordingly, the embodiments are merely described below, by referring to the figures, to explain aspects of the present description.

In drawings, like reference numerals refer to like elements throughout and overlapping descriptions shall not be repeated.

As used herein, the singular forms "a," "an" and "the" are intended to include the plural forms as well, unless the context clearly indicates otherwise.

It will be further understood that the terms "comprises" and/or "comprising" used herein specify the presence of stated features or components, but do not preclude the presence or addition of one or more other features or components. It will be understood that when an element or layer is referred to as being "on" or "connected to" another element or layer, it can be directly on or directly connected to the other element or layer, or intervening elements or layers may be present. In contrast, when an element is referred to as being "directly on" or "directly connected to" another element or layer, there are no intervening elements or layers present. It will be understood that for the purposes of this disclosure, "at least one of X, Y, and Z" can be construed as X only, Y only, Z only, or any combination of two or more items X, Y, and Z (e.g., XYZ, XYY, YZ, ZZ).

Sizes of elements in the drawings may be exaggerated for convenience of explanation. In other words, since sizes and thicknesses of components in the drawings are arbitrarily illustrated for convenience of explanation, the following embodiments are not limited thereto.

When a certain embodiment may be implemented differently, a specific process order may be performed differently from the described order. For example, two consecutively described processes may be performed substantially at the same time or performed in an order opposite to the described order.

FIG. 1 is a schematic diagram of a general structure of a thin-film deposition apparatus.

As shown in FIG. 1, the general thin-film deposition apparatus includes a mask 200 for forming a desired pattern on a substrate 300 that is a deposition target, and a deposition source unit 100 that may eject a deposition gas towards the substrate 300 by moving back and forth inside a chamber 400.

Accordingly, when the deposition source unit 100 ejects the deposition gas inside the chamber 400, the deposition gas passes through an opening formed on the mask 200 and is deposited on the substrate 300 to form a thin film having a pattern determined by the mask 200.

Figure 2:
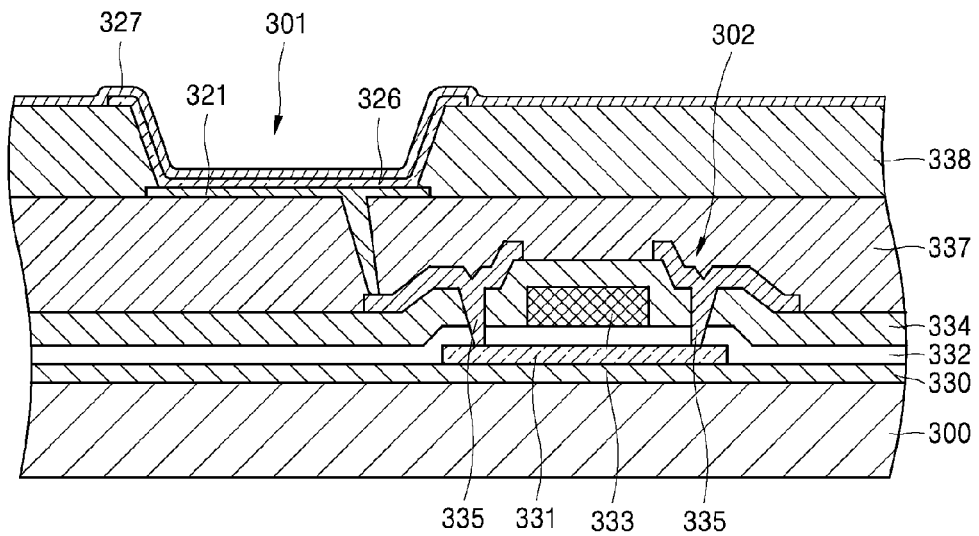
FIG. 2 is a cross-sectional view of a pixel of an organic light-emitting display apparatus, which may be formed by the general thin-film deposition apparatus of FIG. 1.

FIG. 2 is a cross-sectional view of a pixel of an organic light-emitting display apparatus, which may be formed by the thin-film deposition apparatus of FIG. 1. The substrate 300 of FIG. 1 is a substrate of the organic light-emitting display apparatus, and the substrate 300 is relatively thick compared to thin-film layers disposed thereon, but for convenience of illustration, the substrate 300 and the thin-film layers are shown having similar thicknesses.

Referring to FIG. 2, a buffer layer 330 is formed on the substrate 300, and a thin-film transistor (TFT) 302 is formed on the buffer layer 330.

The TFT 302 includes a semiconductor active layer 331, a gate insulating film 332 covering the semiconductor active layer 331, and a gate electrode 333 disposed on the gate insulating film 332.

An interlayer insulating film 334 is formed to cover the gate electrode 333, and source and drain electrodes 335 are formed on the interlayer insulating film 334.

The source and drain electrodes 335 contact a source region and a drain region of the semiconductor active layer 331, respectively, through contact holes formed on the gate insulating film 332 and the interlayer insulating film 334.

A pixel electrode 321 of an organic light-emitting device (OLED) 301 is connected to the source and drain electrodes 335. The pixel electrode 321 is formed on a planarization film 337, and a pixel defining layer 338 is formed to cover the pixel electrode 321. An organic emission layer 326 is formed in an opening of the pixel defining layer 338, and a counter electrode 327 is formed thereon.

If the organic emission layer 326 of the OLED 301 is formed by using the thin-film deposition apparatus of FIG. 1, deposition may be performed by preparing the mask 200 having an opening corresponding to the organic emission layer 326.

However, if the mask 200 is not accurately disposed, a location of the organic emission layer 326 may be slightly different from an expected location. Deposition accuracy of the organic emission layer 326 is important since the organic emission layer 326 directly realizes an image via emission in the display device. Thus, the deposition accuracy may be inspected in order to compensate for an offset of the mask 200.

Figure 3:
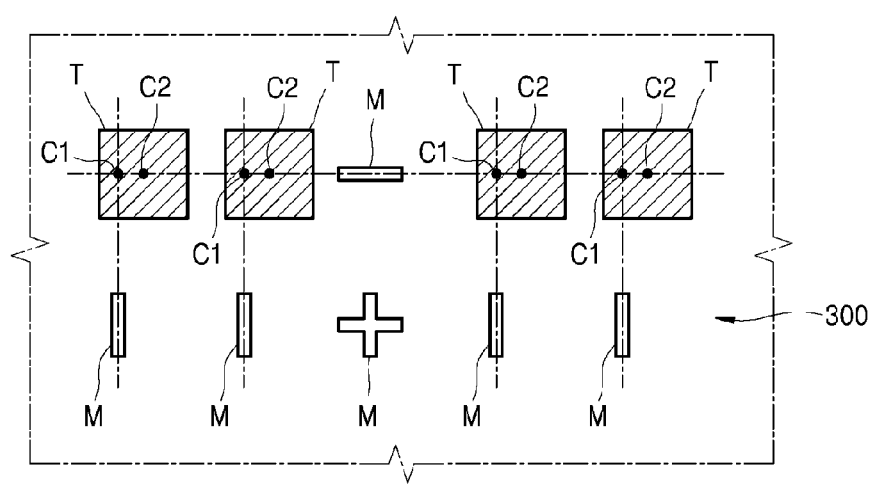
FIG. 3 is a plan view of marks and inspected thin films formed on a substrate for deposition accuracy inspection, according to an exemplary embodiment of the present invention

FIG. 3 is a plan view showing marks M and thin films T formed on the substrate 300 for deposition accuracy inspection, according to an exemplary embodiment of the present invention.

In order to inspect the deposition accuracy, the marks M are formed at one side of the substrate 300. Openings (not shown) for forming the thin films T are formed on the side of the mask 200, and in an area corresponding to a second side of the substrate 300. The openings are disposed at reference center points C1 in an area where virtual extensions of the marks M intersect, as shown in FIG. 3. Accordingly, if the organic emission layer 326 is formed, the thin film T may be formed on the substrate 300 while forming the organic emission layer 326, and if the mask 200 is accurately positioned, a center point C2 of the thin film T corresponds to the reference center point C1 set by the mark M.

However, if the mask 200 is not accurately disposed but is slightly misaligned, the center point C2 of the thin film T may be spaced apart from the reference center point C1 set by the mark M, as shown in FIG. 3. In this case, such a space may be measured as an offset of the mask 200, and the location of the mask 200 may be adjusted, thereby removing the offset.

Figure 4:
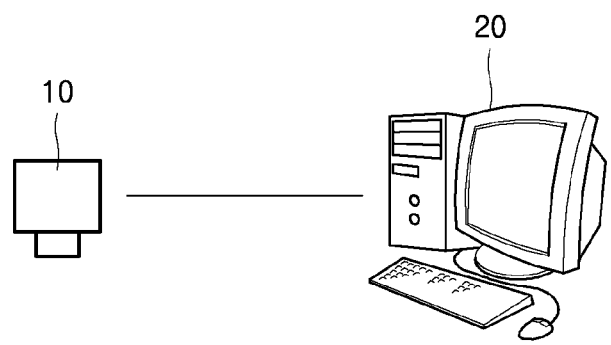
FIG. 4 is a diagram describing a deposition accuracy inspection apparatus according to an exemplary embodiment of the present invention.
Figure 4:

FIG. 4 is a diagram for describing a deposition accuracy inspection apparatus for compensating for the offset of the mask 200, according to an exemplary embodiment of the present invention.

A camera 10 that captures an image of the thin film T while scanning the substrate 300 from above. A controller 20 analyzes the image captured by the camera 10, calculates an interval between the reference center point C1 and the center point C2, i.e., the offset of the mask 200, and performs a compensating operation on the location of the mask 200 based on the calculated offset.

Accordingly, when the camera 10 captures the image of the thin film T, the controller 20 analyzes the interval between the center point C2 of the thin film T and the reference center point C1 set by the mask M to calculate a compensation amount.

However, if the inspected thin films T are scanned and captured as shown in FIG. 3, there may be false measurement data in which image noise is mixed. At this time, the offset and the compensation amount may be wrongly calculated due to the false measurement data.

Figure 5:
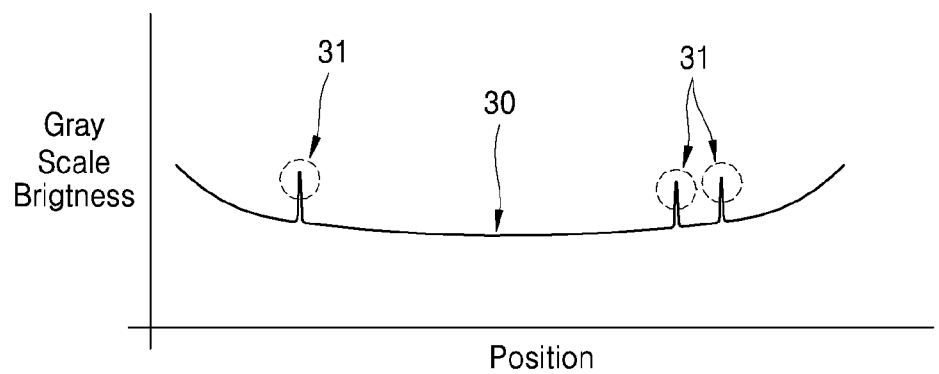
FIG. 5 is a graph of a profile converted to grayscale by the deposition accuracy inspection apparatus of FIG. 4.

Thus, according to the present exemplary embodiment, a process of effectively removing false measurement data may be performed. To this end, the controller 20 converts the image of the thin film T captured by the camera 10 to grayscale (achromatic color) to prepare a brightness profile 30, such as shown in FIG. 5. In this case, data without noise may form a smooth curve because a color profile, such as the demonstrated brightness profile, does not remarkably change since a thin film is formed of one material. For reference, three components of a color may be a hue indicating an achromatic color or a chromatic color, brightness, and chroma. The brightness profile 30 is a type of a color profile. If a peak 31 is formed in the brightness profile 30, as shown in FIG. 5, image noise may be mixed in the image. Such image noise may be the false measurement data, and if the false measurement data is calculated as well, an operation of compensating for the location of the mask 200 may have an error. Thus, when the false measurement data is found, the controller 20 may remove the false measurement data while calculating the offset of the mask 200. In this case, the offset may be accurately calculated and the compensation may be accurately performed since the offset of the mask 200 is calculated by only using accurate measurement data without image noise and the location of the mask 200 is compensated for by using such an offset.

A deposition accuracy inspection method using the deposition accuracy inspection apparatus according to an exemplary embodiment of the present invention will now be described.

If the organic emission layer 326 is to be formed, the substrate 300 and the mask 200 having an opening pattern of the organic emission layer 326 are provided in the chamber 400, and the deposition source unit 100 is activated to deposit the organic emission layer 326 on the substrate 300.

At this time, the thin films T are also formed at one side of the substrate 30.

Then, the deposition accuracy determination apparatus scans above the substrate 300 where the organic emission layer 326 and the thin films T are formed, using the camera 10 to capture the image of the thin films T. Then, the controller 20 converts the image of the thin films T to a grayscale to prepare the brightness profile 30 and determines whether there is the peak 31. Next, the controller 20 compares the reference center point C1 and the center point C2 to calculate the offset by only using data without the peak 31, by excluding the false measurement data with a peak 31. Accordingly, the offset of the mask 200 may be accurately calculated without the false measurement data, and the location of the mask 200 may be accurately adjusted by using the offset.

In another exemplary embodiment of the present invention, the organic emission layer 326 is deposited, the deposition accuracy inspection may be performed in the same manner while forming another thin-film layer on the substrate 300 by using the mask 200.

According to the deposition accuracy determination apparatus and the deposition accuracy determination method using the same according to exemplary embodiments of the present invention, false measurement data may be effectively removed to increase reliability of a deposition accuracy inspection, thereby skipping an extra compensating operation. Thus, manufacturing may also be increased.

While one or more exemplary embodiments have been described with reference to the figures, it will be understood by those of ordinary skill in the art that various changes in form and details may be made therein without departing from the spirit and scope as defined by the following claims.

What is claimed is:

1. A deposition accuracy determination apparatus, comprising:
   a camera mounted inside the deposition accuracy determination apparatus and configured to capture an image of an organic emission layer previously disposed on a substrate; and
   a controller configured to:
   convert the image to a color profile;
   distinguish false measurement data from the color profile by determining a peak in a brightness profile as the false measurement data;
   generate data that excludes the brightness profile peak by excluding the false measurement data from the color profile;
   determine a center point of the organic emission layer by analyzing the data that excludes the brightness profile peak; and
   calculate an offset of a mask by comparing a reference center point of the substrate and the center point of the organic emission layer.

2. The deposition accuracy determination apparatus of claim 1, wherein the brightness profile is in grayscale.

3. A deposition accuracy determination method, the method comprising:
   capturing an image of an organic emission layer previously formed on a substrate using a deposition accuracy determination apparatus comprising a camera and a controller;
   converting the image to a color profile using the controller;
   distinguishing false measurement data from the color profile, using the controller, by determining a peak in a brightness profile as the false measurement data;
   generating data that excludes the brightness profile peak, using the controller, by excluding the false measurement data from the color profile;
   determining a center point of the organic emission layer, using the controller, by analyzing the data that excludes the brightness profile peak; and
   calculating an offset of a mask, using the controller, by comparing a reference center point of the substrate and the center point of the organic emission layer.

4. The deposition accuracy determination method of claim 3, wherein the brightness profile is in grayscale.

5. The deposition accuracy determination method of claim 4, further comprising:
   adjusting a location of the mask to remove the offset by using the controller.

6. The deposition accuracy determination apparatus of claim 1, wherein the false measurement data comprises image noise.

7. The deposition accuracy determination method of claim 3, wherein the false measurement data comprises image noise.

* * * * *